United States Patent [19]
Wada

[11] Patent Number: 4,581,656
[45] Date of Patent: Apr. 8, 1986

[54] FACSIMILE COMMUNICATION APPARATUS

[75] Inventor: Yoshinori Wada, Miura, Japan

[73] Assignee: Ricoh Company, Ltd., Japan

[21] Appl. No.: 492,585

[22] Filed: May 9, 1983

[30] Foreign Application Priority Data

May 10, 1982 [JP] Japan ................................ 57-76513

[51] Int. Cl.$^4$ ............................................. H04N 1/32
[52] U.S. Cl. ..................................... 358/257; 358/293
[58] Field of Search ............... 358/257, 256, 258, 293; 355/14 CU, 14 SH

[56] References Cited

U.S. PATENT DOCUMENTS 4,419,697 12/1983 Wada .................................. 358/257

FOREIGN PATENT DOCUMENTS 2084425 4/1982 United Kingdom ................ 358/257

Primary Examiner—Edward L. Coles, Sr.
Attorney, Agent, or Firm—Guy W. Shoup

[57] ABSTRACT

A facsimile communication apparatus of the type which once stores facsimile data to be transmitted after scanning includes an information adding circuit which adds such information as source of transmission, total number of pages and current page number to each page of facsimile data before transmission. The present apparatus also keeps the current page number of a batch of facsimile data being transmitted and allows to transmit facsimile data from that portion corresponding to the current page number when transmission is resumed after interruption.

5 Claims, 3 Drawing Figures

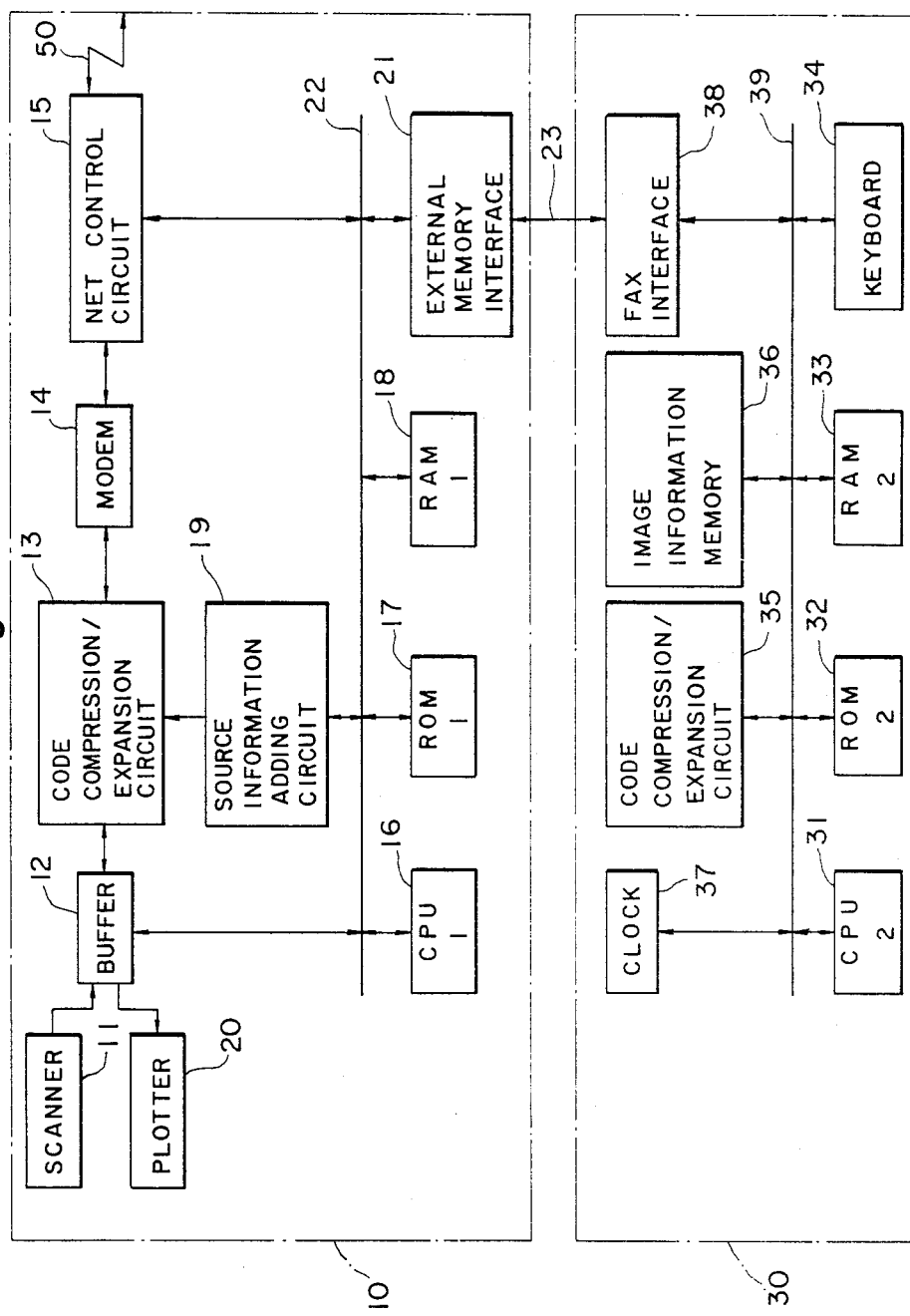

FACSIMILE COMMUNICATION APPARATUS

BACKGROUND OF THE INVENTION

1. Field of the Invention

This invention generally relates to apparatus for communication and in particular to a facsimile communication apparatus capable of transmitting and receiving image information to and from another facsimile communication apparatus at a remote place. More specifically, the present invention relates to a facsimile communication apparatus of the type which once stores information to be transmitted before transmitting it to a destination terminal or a plurality of destination terminals one after another.

2. Description of the Prior Art

Prior art facsimile communication apparatuses of the type which once stores information of an original to be transmitted and transmits the same information to a plurality of destination terminals one after another are not provided with the function of adding additional information to the stored information of an original to be transmitted before transmission. Accordingly, if additional information, such as a date, time, an origin or source of transmission, etc., which is not contained in the information of an original to be transmitted, is desired to be added to the information of an original to be transmitted, it must first be converted into the form of image data before storing the information of an original into an image information memory. The thus converted image data of the desired additional information is then added to the original, and a combination of the additional image data and the original is stored in the image information memory. These conventional apparatuses are disadvantageous partly because of their complexity in operation.

In particular, if the original to be transmitted consists of a plurality of pages and if it is desired to allocate the page number to each of the pages, it is required for an operator to first count the total number of pages and then to key-in the thus counted number, which is cumbersome. Alternatively, if it is desired to record the transmitted information on a plurality of sheets of recording paper with the page number also recorded consecutively, a receiver will increment the count by 1 each time it receives a new page and the count may be converted into the form of image data suitable for recording. In this case, however, once the transmission is interrupted, for example, due to failure of transmission line or the like, the count becomes cleared. Thus, when the transmission is resumed after the interruption, the page number becomes disorderly, which is quite inconvenient.

SUMMARY OF THE INVENTION

The above-described disadvantages of the prior art are overcome with the present invention, and an improved facsimile communication apparatus is provided.

In accordance with the present invention, there is provided a facsimile communication apparatus comprising storing means for storing image information; first counting means for counting the total number of pages while storing image information in said storing means; second counting means for counting the number of pages of said image information which have so far been transmitted; means for adding the information of said count in said first and second counting means to said image information before transmission; and control means for controlling the transmission of said image information with the additional information in accordance with the count of said second counting means such that said image information is transmitted from the portion corresponding to the count of said second counting means when transmission is resumed after interruption.

Therefore, it is a primary object of the present invention to provide an improved facsimile communication apparatus.

Another object of the present invention is to provide a facsimile communication apparatus capable of keeping track of the number of pages of image information which is being transmitted and of transmitting the image information from that portion of the image information which corresponds to the page number where transmission has been interrupted.

A further object of the present invention is to improve a facsimile communication apparatus of the type which is provided with a storing device for storing image information to be transmitted to a remote receiver after scanning an original.

A still further object of the present invention is to improve a facsimile communication apparatus of the type which once stores image information to be transmitted and which transmits the image information thus stored to one or more of remotely located receivers in accordance with a predetermined time sequence automatically.

A still further object of the present invention is to provide a facsimile communication apparatus having the function of adding desired information to image information obtained by scanning an original before transmission to a remote receiver.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram showing the overall structure of a facsimile communication apparatus embodying the present invention.

DESCRIPTION OF THE PREFERRED EMBODIMENTS

Figure 2A:
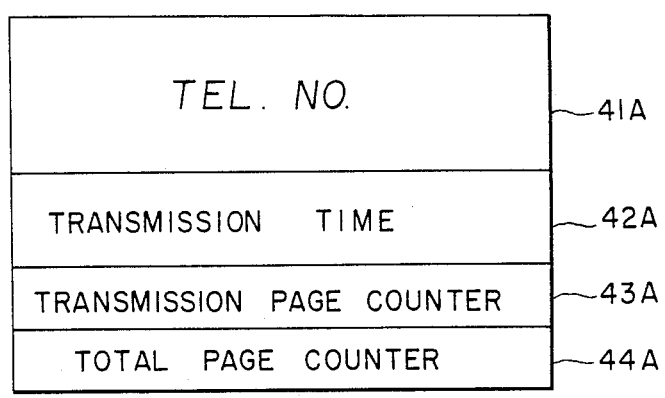
FIGS. 2a and 2b are schematic illustrations showing counters defined in RAM 33 shown in FIG. 1.

Referring now to FIG. 1, there is shown a facsimile communication apparatus constructed in accordance with the present invention, which includes a facsimile transmission/reception unit 10 and an auxiliary storing unit 30. The facsimile transmission/reception unit 10 includes a scanner 11 for scanning an original thereby converting the visual image information of the original into electrical image information. The scanner 11 is connected to a buffer 12, which, in turn, is connected to a code compression/expansion circuit 13. Provided as connected to the code compression/expansion circuit 13 is a MODEM 14 which is also connected to a net control circuit 15.

The facsimile transmission/reception unit 10 further includes a central processing unit or simply CPU 16 which controls the overall operation of the unit 10 and also carries out information processing, a read only memory or simply ROM 17 for storing a predetermined program to be used in the CPU 16 and a random access memory or simply RAM 18 for temporarily storing data to be used by the CPU 16. Also provided as connected between the code compression/expansion circuit 13 and a bus 22 is a source information adding circuit 19 which adds desired information, such as origin or source of transmission, time of transmission, page number, etc., to the image information of the original to be transmitted. The reference numeral "20" indicates a plotter which is to be used for recording image information on a recording medium when the unit 10 is functioning as a receiver, and the reference numeral "21" indicates an external memory interface which interfaces the facsimile transmission/reception unit 10 with the auxiliary storing unit 30.

On the other hand, the auxiliary storing unit 30 includes a CPU 31 which controls the overall operation of the unit 30 and carries out information processing, a ROM 32 for storing a predetermined program to be used by the CPU 31 and a RAM 33 for temporarily storing data to be used by the CPU 31. The auxiliary storing unit 30 also includes a keyboard 34 having at least numeric keys, a code compression/expansion circuit 35, an image information memory 36 for storing image information temporarily, a clock 37 and a FAX interface 38 which is connected to the external memory interface 21 of the facsimile transmission/reception unit 10 through a bus 23. All of the elements 31 through 38 provided in the auxiliary storing unit 30 are interconnected by a bus 39. It is to be noted that the bus 23 interconnecting the units 10 and 30 is preferably comprised of a bus which may be commonly used in various facsimile machines such as an international standard bus IEEE 488. Facsimile information is transmitted to or received from another facsimile machine at a remote place through a telephone line 50.

Figure 2B:
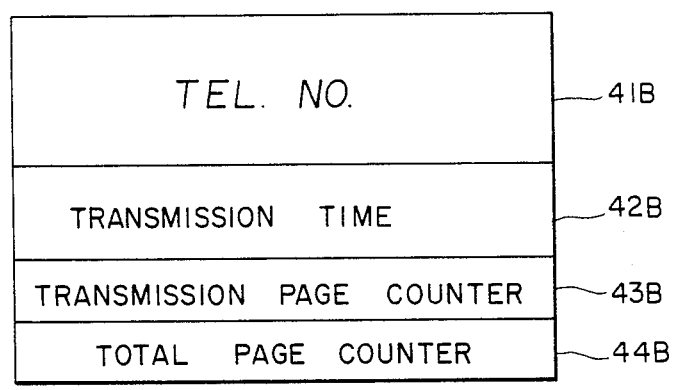

FIGS. 2a and 2b schematically show representative counters which are defined in the RAM 33 and which are controlled by the CPU 31 and the program stored in the ROM 32. It is to be noted that a desired number of such counters may be provided in the RAM 33, and each counter can store the telephone number of a particular destination terminal. Thus, the facsimile communication apparatus of FIG. 1 can transmit the identical facsimile information temporarily stored in the memory 36 to a plurality of destination terminals in sequence according to facsimile telephone numbers stored in the counters of RAM 33.

As shown in FIGS. 2a and 2b, each of the counters, identical in structure, includes a first section 41A, 41B for storing telephone number of a destination terminal, a second section 42A, 42B for storing time of transmission, a third section 43A, 43B for counting the number of pages of facsimile information so far transmitted and a fourth section 44A, 44B for counting the total number of pages of a batch of facsimile information to be transmitted.

In operation, a documentary or pictorial original (not shown) is first scanned by the scanner 11 so that the visual image information of the original is converted into electrical image information which is then supplied to the buffer 12 where the thus supplied image information is converted into 8-bit parallel data. Then the 8-bit parallel data is transferred to the external memory interface 21 through the bus 22, from where the data is further supplied to the code compression/expansion circuit 35 via the bus 23, FAX interface 38 and bus 39, where the data is subjected to code compression operation. Thereafter the thus compressed data is stored into the image information memory 36 again via the bus 39.

Each time when the image data or information of the amount corresponding to a single page of a particular size has been stored into the memory 36, the count in the total page counter section 44A, 44B of each of the counters defined in the RAM 33 is incremented by 1 thereby allowing the count in this section of the counter to indicate the total number of pages for a batch of image information stored in the memory 36. Thus, upon completion of this data storage mode, the count indicating the total number of pages is maintained in this section 44A, 44B of each of the counters defined in the RAM 33. On the other hand, the facsimile telephone number of a particular destination terminal and time of transmission are manually written into the telephone number section 41A, 41B and the transmission time section 42A, 42B, respectively, through the keyboard 34 by an operator.

Then follows the mode of transmission; however, in the present embodiment, it is assumed that the image information stored in the memory 36 is first transmitted to a destination terminal A whose telephone number is stored in the counter of FIG. 2a and then to a destination terminal B whose telephone number is stored in the counter of FIG. 2b.

The CPU 31 constantly compares the transmission time stored in section 42A of the counter of FIG. 2a with the time of clock 37. When the transmission time in the section 42A is reached, the telephone number stored in the section 41A is supplied to the FAX interface 38 through the bus 39. From the FAX interface 38, the telephone number is then transferred through the external memory interface 21 and the bus 22 to the net control circuit 15 where automatic calling of the thus transferred telephone number is carried out. As a result, when the connection of the telephone line 50 to the destination terminal A is established, the counts in the transmission page counter section 43A and the total page counter section 44A are transferred to the source information adding circuit 19 through the bus 39, FAX interface 38, bus 23, external memory interface 21 and bus 22. Thus, at the source information adding circuit 19, together with source information such as an origin and time of transmission, the total page number or count stored in the form of a code in the section 44A is converted into the corresponding character of 5×7 dot matrix, which is then supplied to the code compression/expansion circuit 13.

As is well known in the art, the code compression/expansion circuit 13 is so structured to carry out the compression or expansion operation in commensurate in function with a facsimile communication apparatus to or from which facsimile data is to be transmitted. In the present case, the facsimile data to be transmitted to the facsimile terminal A (not shown) through the telephone line 50 is compressed to appropriate codes in commensurate with the function of the facsimile terminal A, and then the thus compressed codes are modulated by the MODEM 14 and supplied to the telephone line 50 via the net control circuit 15.

Upon completion of transmission of source information as described above, the first page portion of the compressed facsimile data of an original stored in the image information memory 36 is expanded by the code compression/expansion circuit 35 to provide the original uncompressed facsimile data. On the other hand, since the count of the transmission page counter section 43A is incremented by 1 each time when a single page worth facsimile data has been read out of the image information memory 36, upon completion of read out of the first page portion from the memory 36, the count in the transmission page counter section 43A becomes "1". Then the count of the transmission page counter section 43A, which is presently "1" and indicates the current page of transmission, together with the count of the total page counter section 44A, indicating the total number of pages of the current batch of facsimile data, is read out of the RAM 33.

These facsimile and page data thus read out are then transferred to the buffer 12 via the bus 39, FAX interface 38, bus 23, external memory interface 21 and bus 22 and stored therein temporarily. Such a structure of having the data temporarily stored in the buffer 12 after read out allows to operate the units 10 and 30 independently from each other or asynchronously. The data thus temporarily stored in the buffer 12 is then supplied to the code compression/expansion circuit 13 to be converted into compressed codes in commensurate with the function of the other facsimile communication apparatus now in connection, and the compressed data are output to the telephone line 50 via the MODEM 14 and net control circuit 15.

Having completed the transmission of the first page facsimile data, the count of the transmission page counter section 43A is incremented by 1 to become "2", and, at the same time, the second page facsimile data is read out of the image information memory 36. Thereafter, similarly with the above-described operation for the first page, the second page facsimile data thus read from the memory 36 is added by the total page and current transmission page data read from the RAM 33 and then output to the telephone line 50 for transmission. The similar operation is carried out repetitively until the count of the transmission page counter section 43A becomes equal to the count of the total page counter section 44A, thereby allowing to transmit all pages of facsimile information to the other facsimile apparatus A in communication.

Upon completion of transmission of a batch of facsimile information to the facsimile terminal A, the CPU 31 constantly compares the transmission time stored in the section 42B of the counter (FIG. 2b) having the telephone number of another facsimile terminal B (not shown) in the section 41B with the time of the clock 37. When the predetermined transmission time stored in the section 42B has been reached, the telephone number stored in the section 41B is dialed automatically so that the connection to the terminal B through the telephone line 50 is established. Accordingly, similarly with the previous case of transmission to the facsimile terminal A, total and current transmission page added facsimile data may be transmitted to the facsimile terminal B one page after another.

On the other hand, when the facsimile apparatus shown in FIG. 1 operates as a receiving station, the compressed facsimile data having the additional information of source of transmission and page data transmitted through the telephone line 50 is received by the net control circuit 15 and demodulated by the MODEM 14. The data is then expanded by the code compression/expansion circuit 13 and the thus uncompressed data is supplied to the plotter 20 through the buffer 12 so that the image information of an original together with source and page information may be plotted on recording paper. Alternatively, after expansion by the code compression/expansion circuit 13, the uncompressed data may be stored in the image information memory 36. In this alternative case, the data thus stored in the memory 36 may be fed to the plotter 20 at any desired time.

In carrying out compression or expansion of image data in the above-described embodiment, the code compression/expansion circuit 13 employs the two dimensional compression method and the code compression/expansion circuit 35 employs the one dimensional compression method. It should be noted however that both of the circuits 13 and 35 carry out compression or expansion of image data in the same method.

In the case of transmission interruption due to telephone line failure, request by an operator, etc., the total page counter sections 44A, 44B and the current transmission page counter sections 43A, 43B hold the counts. Accordingly, when transmission is resumed after interruption, transmission is resumed from that portion of the facsimile data which corresponds to the current count held in the transmission page counter section 43A, 43B. Accordingly, the occurrence of interruption in transmission does not affect the order of facsimile data as well as the sequence of page number in any manner in accordance with the present invention.

While several embodiments of this invention have been described above, other embodiments of this invention will be obvious in view of the above description to those skilled in the art. The above description is therefore intended to be illustrative only and not limiting the scope of this invention, which is to be determined by the appended claims.

What is claimed is:

1. A facsimile communication apparatus comprising:
   storing means for storing information;
   first counting means for counting the total number of pages while storing a batch of image information in said storing means;
   second counting means for counting the number of pages of said batch of image information which have so far been transmitted;
   means for adding the information of said count in said first and second counting means to said batch of image information before transmission; and
   control means for controlling the transmission of said batch of image information having the additional information in accordance with the count of said second counting means such that said batch of image information is transmitted from the portion corresponding to the current count of said second counting means when transmission is resumed after interruption until the count of said second counting means has reached the count of said first counting means.

2. Apparatus of claim 1 further comprising:
   telephone number storing means for storing a telephone number of another facsimile communication apparatus with which communication is desired to be carried out; and
   transmission time storing means for storing desired transmission time at which the transmission of the image information stored in said storing means to said another facsimile communication apparatus is initiated.

3. Apparatus of claim 2 further comprising a keyboard for having a desired telephone number and transmission time stored in said telephone number storing means and transmission time storing means, respectively, by an operator.

4. Apparatus of claim 2 wherein said first and second counting means and said telephone number and transmission time storing means are defined by part of a random access memory.

5. Apparatus of claim 1 further comprising a code compression/expansion circuit for compressing said image information before being stored into said storing means and expanding said image information after being read out of said storing means.

* * * * *